United States Patent
Hirose et al.

(10) Patent No.: US 12,158,202 B2
(45) Date of Patent: Dec. 3, 2024

(54) GEAR DEVICE

(71) Applicant: TOYOTA BOSHOKU KABUSHIKI KAISHA, Kariya (JP)

(72) Inventors: Takayuki Hirose, Fujisawa (JP); Kouhei Izuchi, Fujisawa (JP)

(73) Assignee: TOYOTA BOSHOKU KABUSHIKI KAISHA, Kariya (JP)

( * ) Notice: Subject to any disclaimer, the term of this patent is extended or adjusted under 35 U.S.C. 154(b) by 0 days.

(21) Appl. No.: 18/177,255

(22) Filed: Mar. 2, 2023

(65) Prior Publication Data
US 2023/0323943 A1     Oct. 12, 2023

(30) Foreign Application Priority Data
Apr. 8, 2022   (JP) ................................ 2022-064685

(51) Int. Cl.
*F16H 57/04* (2010.01)
(52) U.S. Cl.
CPC ..... *F16H 57/0468* (2013.01); *F16H 57/0432* (2013.01)
(58) Field of Classification Search
CPC .......... F16H 19/08; F16H 1/16; H02K 7/1166
See application file for complete search history.

(56) References Cited

U.S. PATENT DOCUMENTS

| 2013/0109526 A1 | 5/2013 | Oishi |
| 2013/0180348 A1* | 7/2013 | Andres ................. F16H 37/041 74/89.14 |
| 2013/0333496 A1* | 12/2013 | Boutouil .............. B60N 2/2252 74/89 |

FOREIGN PATENT DOCUMENTS

JP     2013-99085 A     5/2013

* cited by examiner

*Primary Examiner* — Jake Cook
(74) *Attorney, Agent, or Firm* — Oblon, McClelland, Maier & Neustadt, L.L.P.

(57) ABSTRACT

A gear device includes a first gear, a second gear, and a third gear. The second gear is offset eccentrically when the first gear is rotated. The third gear is rotated at a speed slower than a rotation speed of the first gear when the second gear is offset eccentrically. The stopper plate is engaged with the second gear through a fitting structure thereby restricting rotational movement of the second gear while permitting linear movement of the second gear. One of the second gear and the stopper plate includes an engagement claw. The other one of the second gear and the stopper plate includes a recess engaged with the engagement claw. The engagement claw includes a grease sump that holds grease applied between the recess and the engagement claw.

10 Claims, 8 Drawing Sheets

GEAR DEVICE

BACKGROUND

1. Field

The present disclosure relates to a gear device.

2. Description of Related Art

Japanese Laid-Open Patent Publication No. 2013-99085 describes a gear device for a seat lifter.

As shown in FIG. 14, a gear device 70 of the above publication includes a worm gear (worm wheel) 71, which serves as a first gear 75 coupled to an eccentric shaft 74, and an external gear 72, which serves as a second gear offset eccentrically by rotation of the worm gear (worm wheel) 71. The eccentric offsetting of the external gear 72 rotates an internal gear 73, serving as a third gear, at a slower speed than the worm gear (worm wheel) 71. The gear device 70 includes a stopper plate 76 that permits linear movement of the external gear 72 and restricts rotational movement of the external gear 72. Two engagement claws 72a project from the external gear 72 in the thickness-wise direction. The stopper plate 76 includes two recesses 76a engaged with the engagement claws 72a. The engagement of the engagement claws 72a of the external gear 72 with the recesses 76a of the stopper plate 76 permits linear movement of the external gear 72 and restricts rotational movement of the external gear 72.

The gear device 70 includes a housing 77 that accommodates the stopper plate 76 in a state permitting linear movement of the stopper plate 76 and restricting rotational movement of the stopper plate 76. A cover 78 is attached to the housing 77 in a state accommodating the worm gear (worm wheel) 71, the external gear 72, and the internal gear 73.

As shown in FIG. 14, like in the gear device 70 of the above publication, grease is usually applied between the engagement claws 72a and the corresponding recesses 76a. As the external gear 72 linearly moves relative to the stopper plate 76, the grease escapes from between the engagement claws 72a and the recesses 76a and decreased over time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a gear device includes a first gear, a second gear offset eccentrically when the first gear is rotated, a third gear rotated at a speed slower than a rotation speed of the first gear when the second gear is offset eccentrically, and a stopper plate engaged with the second gear through a fitting structure thereby restricting rotational movement of the second gear while permitting linear movement of the second gear. One of the second gear and the stopper plate includes an engagement claw. The other one of the second gear and the stopper plate includes a recess engaged with the engagement claw. The engagement claw includes a grease sump that holds grease applied between the recess and the engagement claw.

With this configuration, grease is held by the grease sump of the engagement claw. This limits decreases in the grease applied between the engagement claw and the recess over time.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

With reference to FIGS. 1 to 13, a gear device 32 will now be described.

Seat Lifter

Figure 1:
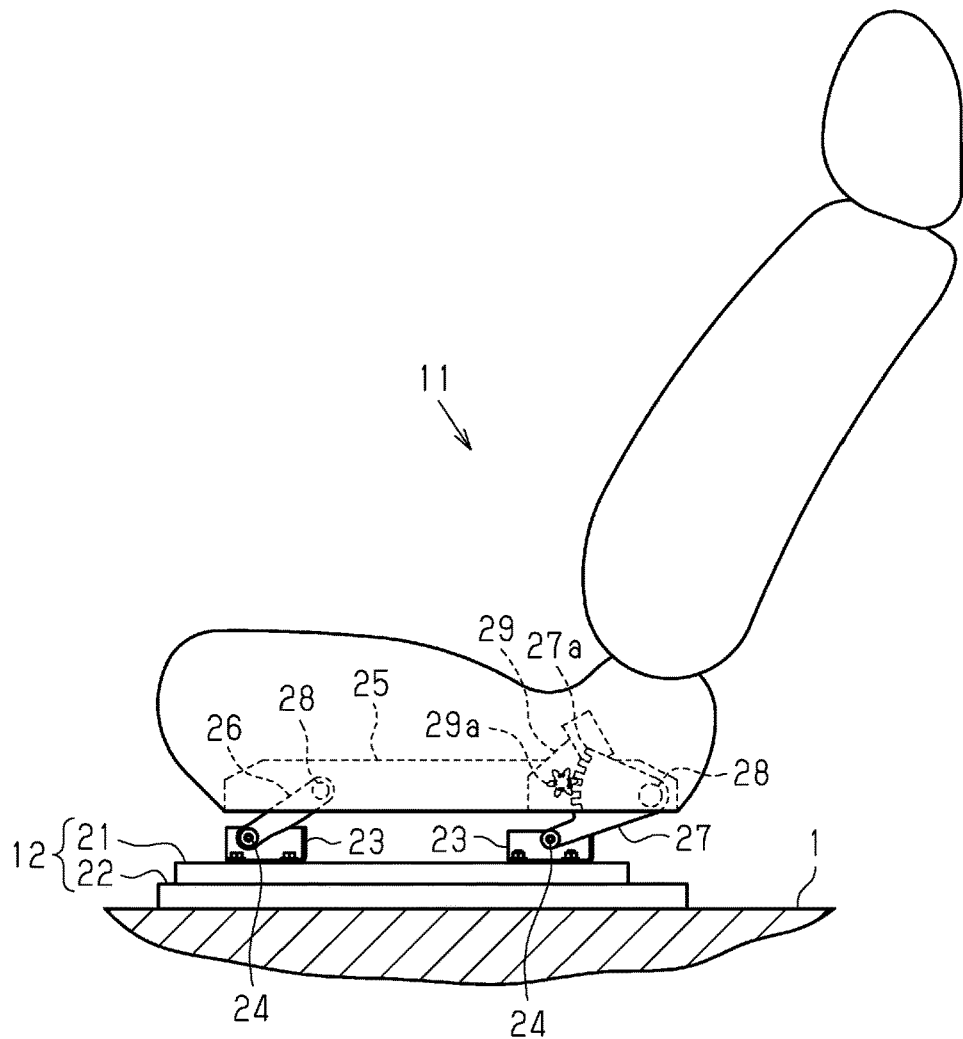
FIG. 1 is a side view of a seat.

FIG. 1 is a side view of a seat 11. The seat 11 is arranged in a vehicle such as a four-wheel automobile. Slide rails 12 are arranged on a floor 1 of the vehicle. Each slide rail 12 includes two upper rails 21 and two lower rails 22. The lower rails 22 are coupled to the floor 1 of the vehicle. The upper rails 21 are coupled to the lower rails 22 in a manner slidable in the front and rear direction.

Brackets 23 are coupled to each upper rail 21 near the front and rear ends. A front link 26 is coupled by a pin 24 to each front bracket 23. A rear link 27 is coupled by a pin 24 to each rear bracket 23. Thus, two front links 26 and two rear links 27 are coupled by the brackets 23 to the two upper rails 21. Each front link 26 and each rear link 27 is pivotally coupled to the corresponding bracket 23.

The front links 26 and the rear links 27 each include an end that is opposite to the end coupled to the corresponding bracket 23 and coupled by a rod 28 to a cushion frame 25. The front links 26 and the rear links 27 are pivotally coupled to the cushion frame 25.

The brackets 23, the front links 26, the rear links 27, and the cushion frame 25 form a four-joint pivoting mechanism.

One of the two rear links 27 includes a gear 27a. The gear 27a includes teeth arranged in an arcuate manner about the corresponding rod 28.

A drive device 29 is coupled to the cushion frame 25. The drive device 29 incudes a pinion 29a. The pinion 29a meshes with the teeth of the gear 27a on the rear link 27 The drive device 29 is driven to rotate the pinion 29a. Rotation of the pinion 29a changes the position of the pinion 29a relative to the gear 27a. This changes the distance between the pin 24, which is fixed to the rear link 27, and the pinion 29a. When the distance changes between the pin 24, which is fixed to the rear link 27, and the pinion 29a, the four-joint pivoting mechanism acts to pivot the rear link 27 about the pin 24. This raises or lowers the cushion frame 25 relative to the brackets 23.

The brackets 23, the front links 26, the rear links 27, the cushion frame 25, and the drive device 29 form the seat lifter. The drive device 29 may be referred to as a gear box motor.

Drive Device 29

Figure 2:
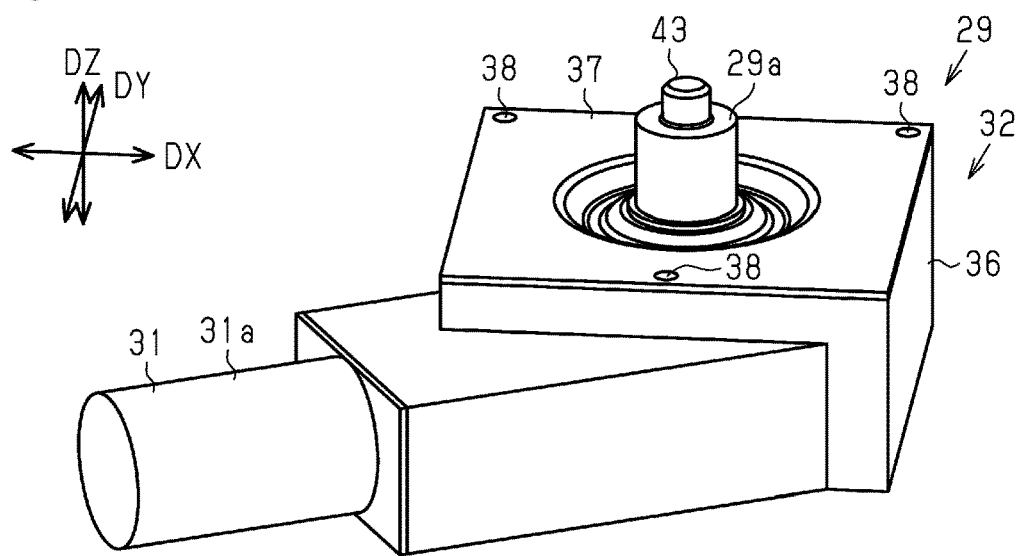
FIG. 2 is a perspective view of a drive device.
Figure 3:
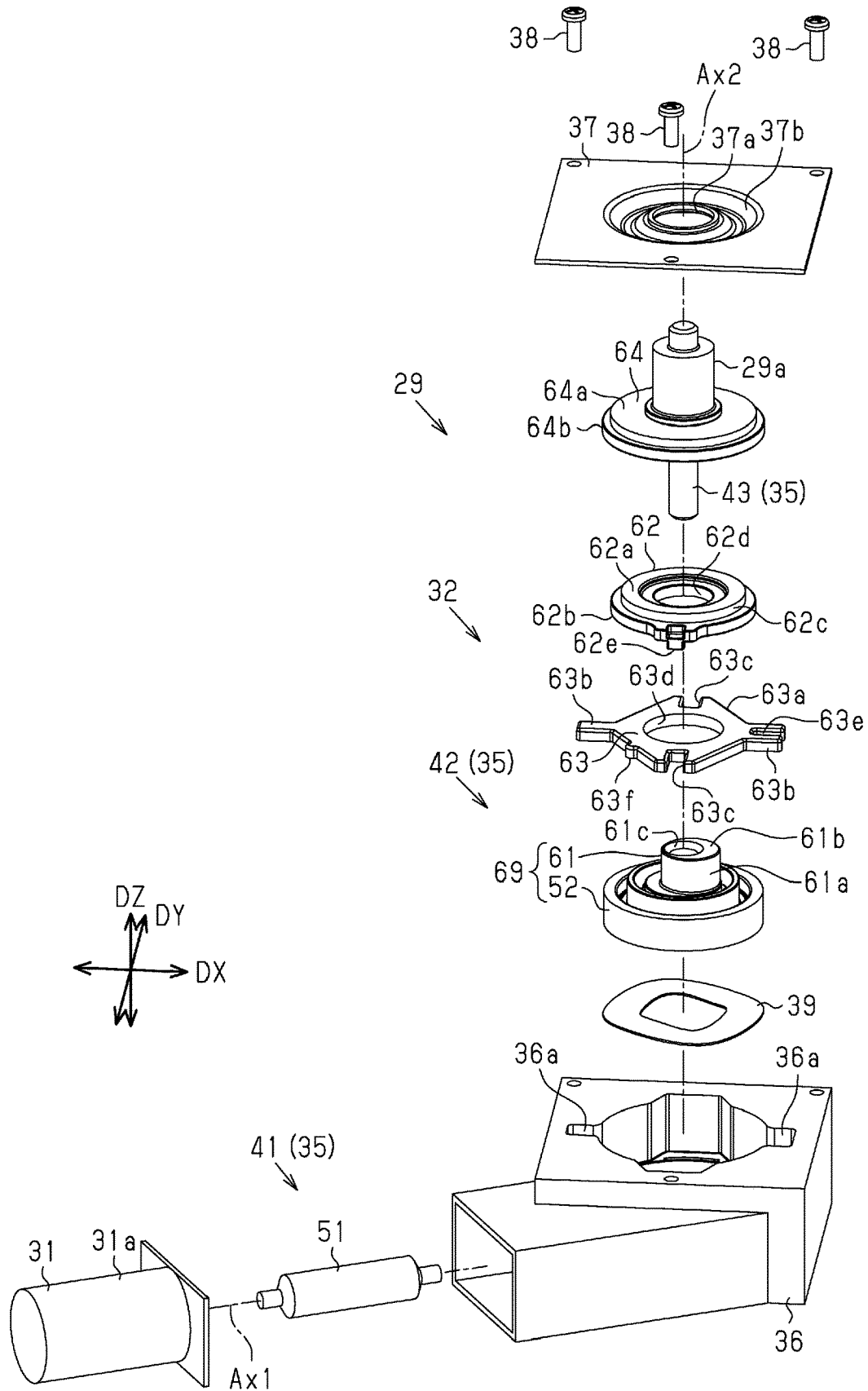
FIG. 3 is an exploded perspective view of the drive device.

As shown in FIGS. 2 and 3, the drive device 29 includes a motor 31 and a gear device 32. The gear device 32 reduces the speed of the rotation generated by the motor 31 to rotate the pinion 29a. Thus, the gear device 32 may be referred to as a reduction gear. FIG. 2 does not accurately show how many teeth the pinion 29a has. Likewise, other drawings do not accurately show the teeth of gears.

As shown in FIG. 3, the motor 31 includes a case 31a and components accommodated in the case 31a. The components include, for example, a motor shaft, a stator, a rotor, coils, and magnets (none shown). The motor 31 is driven by electric power and rotates the motor shaft about a rotation axis Ax1.

Gear Device 32

Figure 4:
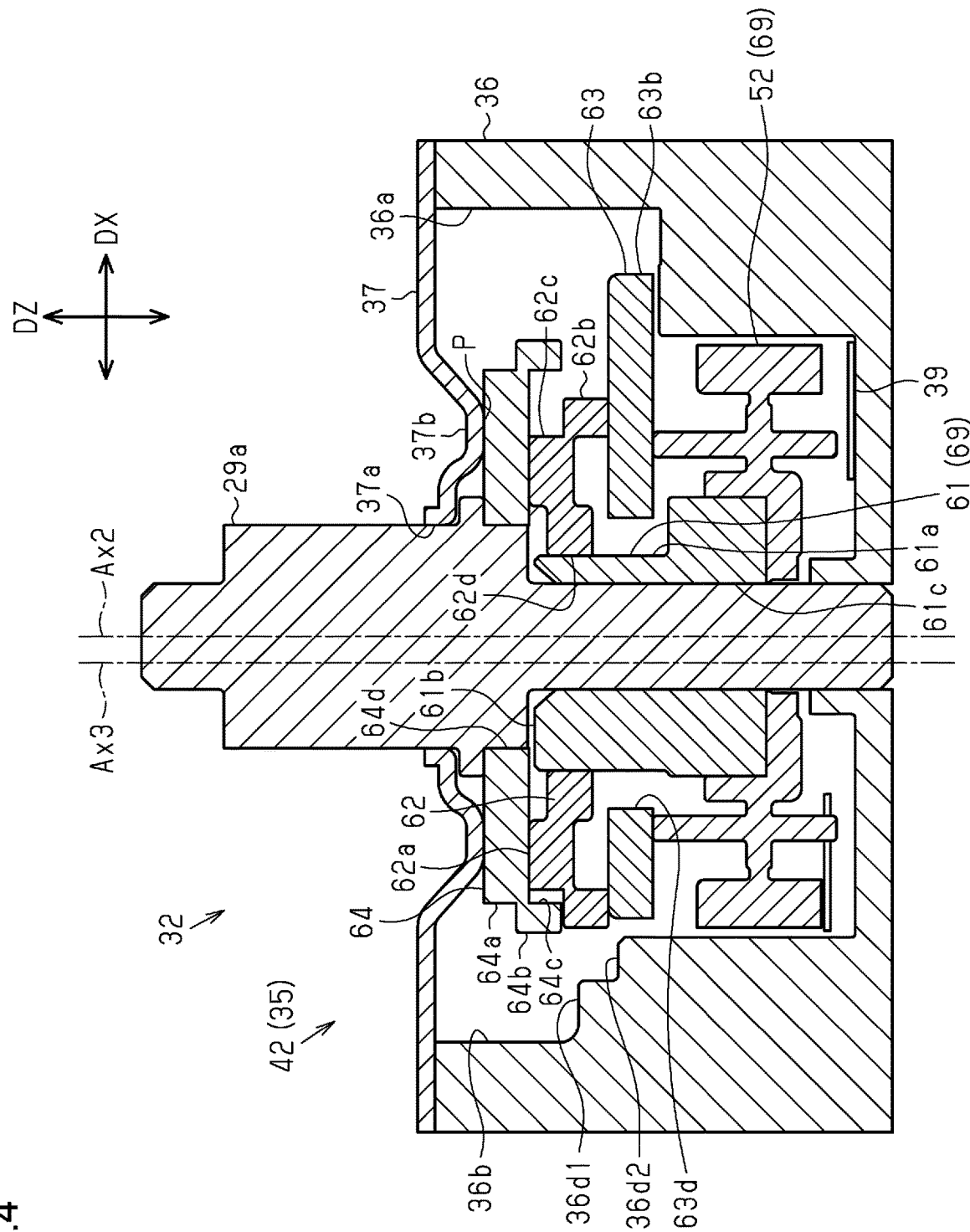
FIG. 4 is a cross-sectional view of the drive device.

As shown in FIGS. 3 and 4, the gear device 32 includes a rotation transmission mechanism 35, a hollow housing 36 having a closed bottom end, and a cover 37.

The rotation transmission mechanism 35 is accommodated in the housing 36. The rotation transmission mechanism 35 includes a first reduction unit 41 serving as a reduction mechanism, a second reduction unit 42 also serving as a reduction mechanism, and an output shaft 43. The drive force of the motor 31 is transmitted via the first reduction unit 41 to the second reduction unit 42, and further from the second reduction unit 42 to the output shaft 43.

The output shaft 43 is supported by the housing 36 and the cover 37 so as to be rotatable about a rotation axis Ax2. The rotation axis Ax2, which is the center axis of the output shaft 43, extends in a direction intersecting the direction in which the rotation axis Ax1 extends.

The pinion 29a of the drive device 29 is arranged on the output shaft 43. The pinion 29a projects out of the housing 36. The pinion 29a is rotatable about the rotation axis Ax2 integrally with the output shaft 43.

As shown in FIGS. 3 and 4, the direction in which the rotation axis Ax2 extends is referred to as the up-down direction DZ, the direction in which arms 63b of a stopper plate 63, which will be described later, is referred to as the width direction DX, and the direction in which recesses 63c of the stopper plate 63 are arranged next to each other is referred to as the front-rear direction DY Rotation Transmission Mechanism 35

As shown in FIG. 3, the first reduction unit 41 includes a worm 51 and a worm wheel 52, which serves as a gear portion. The worm 51 is coupled to the motor shaft of the motor 31 and rotated integrally with the motor shaft about the rotation axis Ax1.

As shown in FIGS. 3 and 4, the worm wheel 52 is supported by the housing 36 and the output shaft 43 so as to be rotatable about the rotation axis Ax2. The worm wheel 52, the center of which is the rotation axis Ax2, is disc-shaped and supported in the housing 36 by an urging member 39, such as a Belleville spring.

In the first reduction unit 41, when the driving force of the motor 31 rotates the worm 51 about the rotation axis Ax1, the worm wheel 52, which is meshed with the worm 51, is rotated about the rotation axis Ax2. The first reduction unit 41 reduces the rotation of the motor shaft of the motor 31 in speed when the worm wheel 52 is rotated.

The second reduction unit 42 includes an eccentric shaft 61 projecting from the worm wheel 52, an external gear 62 serving as a second gear, the stopper plate 63 serving as a restriction member, and an internal gear 64 serving as an internal gear. In the present embodiment, the eccentric shaft 61 is joined and integrated with the worm wheel 52. The eccentric shaft 61 and the worm wheel 52 form a first gear 69. The structure of the first gear 69 will be described later.

The components of the second reduction unit 42 will now be described.

Eccentric Shaft 61

As shown in FIGS. 3 and 4, the eccentric shaft 61 projects from the worm wheel 52 along a rotation axis Ax3. The rotation axis Ax3 is parallel to the rotation axis Ax2 and separated from the rotation axis Ax2. Thus, the rotation axis Ax3, which is the center of the eccentric shaft 61, is offset from the rotation axis Ax2, which is the center of the worm wheel 52.

The eccentric shaft 61 includes an insertion hole 61c extending from a distal end surface 61b at the side closer to the internal gear 64. The center of the insertion hole 61c coincides with the rotation axis Ax2. The rotation axis Ax3, which is the center of an outer circumferential surface 61a of the eccentric shaft 61, is offset from the rotation axis Ax2. As will be described later, the output shaft 43 is inserted through the insertion hole 61c of the eccentric shaft 61 in a relatively rotatable manner.

The eccentric shaft 61 is rotatable integrally with the worm wheel 52. The worm wheel 52, which rotates about the rotation axis Ax2, moves at least the outer circumferential surface 61a of the eccentric shaft 61 in a circumferential direction about the rotation axis Ax2. Thus, the eccentric shaft 61 revolves about the rotation axis Ax2. The rotation axis Ax3 also moves (revolves) together with the eccentric shaft 61 in the circumferential direction about the rotation axis Ax2.

Stopper Plate 63

As shown in FIG. 3, the stopper plate 63 is located between the worm wheel 52 and the external gear 62 in the direction of the rotation axis Ax2. The stopper plate 63, which is supported by the housing 36, supports the external gear 62.

Figure 5:
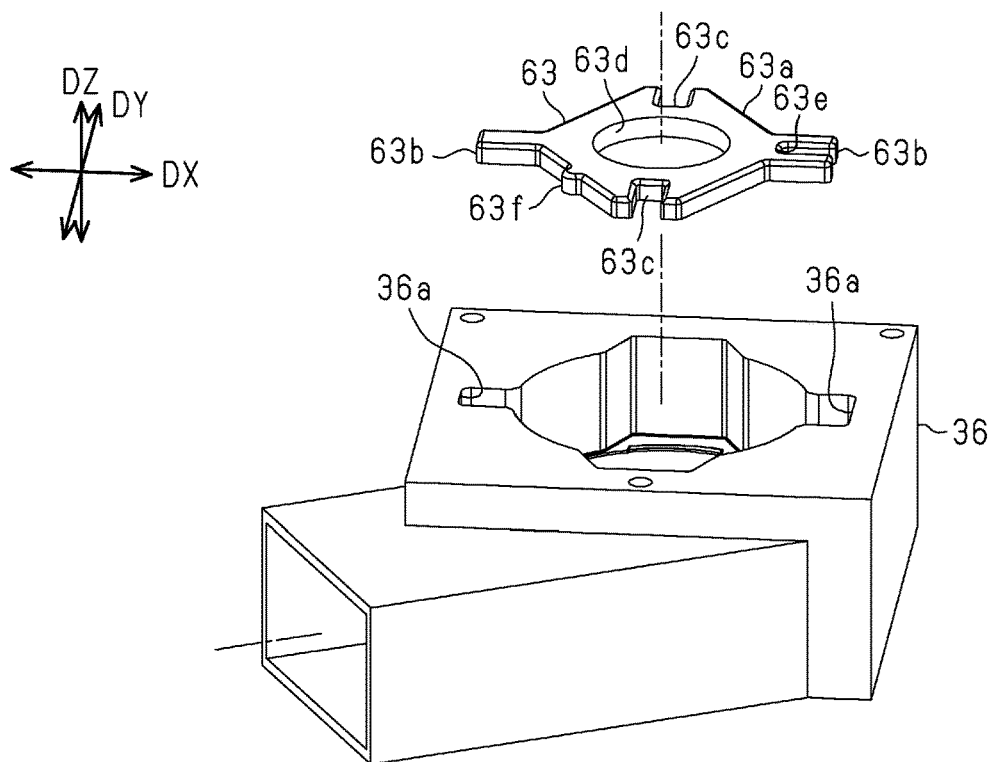
FIG. 5 is a perspective view of a housing and a stopper plate.
Figure 6:
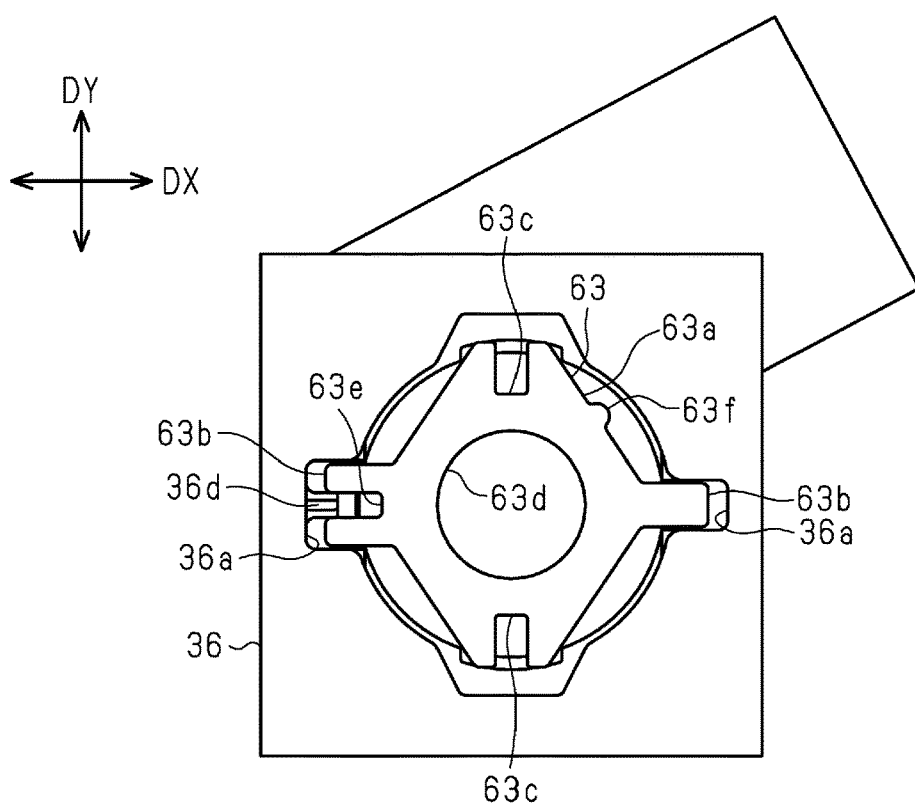
FIG. 6 is a plan view of the housing and the stopper plate.

As shown in FIGS. 5 and 6, the stopper plate 63 includes a generally rhombic main body 63a. The main body 63a includes two corners opposing each other in the front-rear direction DY, and two corners opposing each other in the width direction DX.

Two arms 63b extend toward opposite sides in the width direction DX from the middle of the main body 63a with respect to the front-rear direction DY. One of the two arms 63b includes a bifurcated branching portion 63e.

Two recesses 63c, or notches, are recessed inward in the front-rear direction DY at the middle part of the main body 63a with respect to the width direction DX. A circular through hole 63d extends through the central part of the main body 63a.

As shown in FIG. 6, the main body 63a of the stopper plate 63 includes a protrusion 63f. The protrusion 63f, which is located between one of the two recesses 63c and one of the two arms 63b, protrudes from the main body 63a in a direction extending along the surface of the stopper plate 63. The protrusion 63f of the stopper plate 63 facilitates visual recognition of the front and rear sides of the stopper plate 63.

In the example shown in FIG. 6, the side of the stopper plate 63 facing the viewer is the front side. In this case, if the stopper plate 63 were to be accommodated in the housing 36 with the front and rear sides reversed, one would easily notice that the front and rear sides of the stopper plate 63 are reversed because of the different position of the protrusion 63f.

Further, when assembling the gear device 32, a stack of stopper plates 63 may be prepared so that the stopper plates 63 are removed from the stack one at a time and coupled to a housing 36. In this case, the protrusions 63f are arranged at the same position in the stack so that there will be no stopper plates 63 with reversed front and rear sides. A jig for stacking the stopper plates 63 in advance may be used so that interference will occur with the protrusion 63f when a stopper plate 63 is set on the jig with front and rear sides reversed.

The protrusion 63f is not particularly limited in shape and may be replaced by a recess. The protrusion 63f may have any shape as long as it does not affect the performance required for the stopper plate 63.

As shown in FIGS. 5 and 6, the arms 63b of the stopper plate 63 are accommodated in two accommodation pits 36a of the housing 36.

Figure 7:
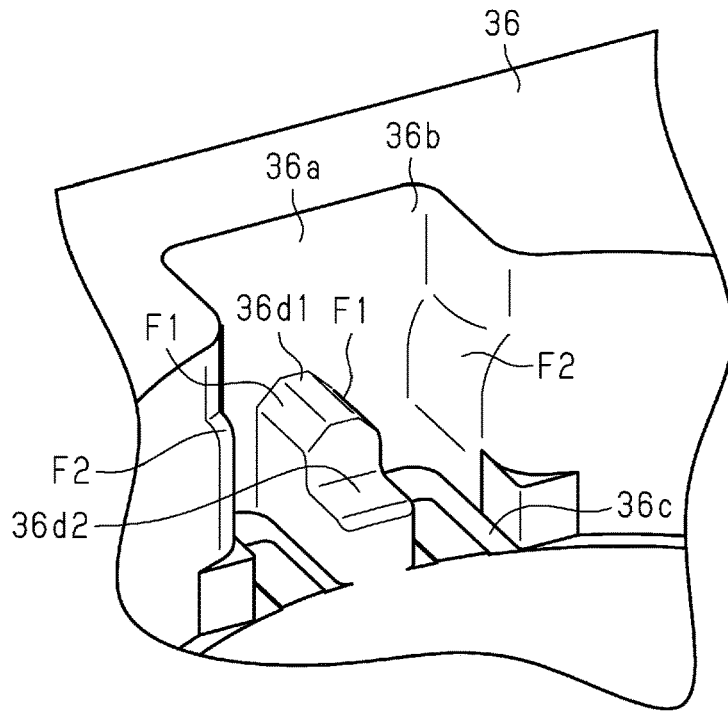
FIG. 7 is an enlarged view of an accommodation pit of a housing.

As shown in FIGS. 6 and 7, the accommodation pits 36a of the housing 36 are located in the inner wall of the housing 36 at the two ends in the width direction DX and outwardly recessed in the width direction DX. Each accommodation pit 36a includes a peripheral wall 36b and a bottom wall 36c and is open upward in the up-down direction DZ and inward in the width direction DX.

One of the accommodation pits 36a includes a projected wall 36d projecting upward from the bottom wall 36c. The projected wall 36d is continuous with the corresponding peripheral wall 36b. The projected wall 36d includes a first projected wall 36d1, continuous with the peripheral wall 36b, and a second projected wall 36d2, continuous with the first projected wall 36d1. The first projected wall 36d1 and the second projected wall 36d2 extend in the width direction DX.

Figure 8:
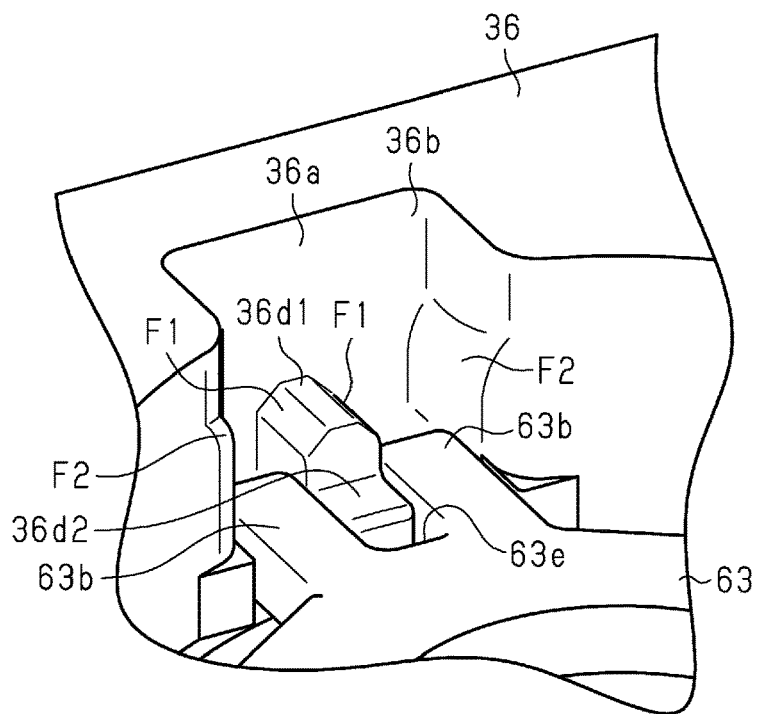
FIG. 8 is an enlarged view of the accommodation pit of the housing in a state accommodating an arm of the stopper plate.

As shown in FIG. 8, the first projected wall 36d1 is greater in upward projecting height than the second projected wall 36d2 and greater in thickness than the arm 63b. The projecting height of the second projected wall 36d2 is less than the thickness of the arm 63b.

As shown in FIG. 7, the distal portion, or upper end, of the first projected wall 36d1 includes sloped surfaces F1. More specifically, a view of the first projected wall 36d1 taken in the width direction DX will show the first projected wall 36d1 narrowed toward its tip by the sloped surfaces F1.

A view of the accommodation pit 36a taken in the width direction DX will show that the middle of the peripheral wall 36b of the accommodation pit 36a in the up-down direction DZ includes inclined surfaces F2 inclined outward in the front-rear direction DY. The inclined surfaces F2 results in the dimensions of the accommodation pit 36a in the front-rear direction DY being greater at an upper portion than a middle portion in the up-down direction DZ. Thus, the opening is relatively large at the upper end of the accommodation pit 36a.

As described above, the projecting height of the first projected wall 36d1 is greater than the thickness of the arm 63b, the distal portion of the first projected wall 36d1 is narrowed toward its tip, and the opening at the upper end of the accommodation pit 36a is relatively large. Thus, when accommodating the corresponding arm 63b in the accommodation pit 36a, the arm 63b can be guided into the accommodation pit 36a. More specifically, when accommodating the arm 63b in the accommodation pit 36a, even if the arm 63b is slightly displaced relative to the accommodation pit 36a, the first projected wall 36d1 and the peripheral wall 36b of the accommodation pit 36a will contact the arm 63b and easily guide the arm 63b to the correct position. Further, the projecting height of the second projected wall 36d2 is less than the thickness of the arm 63b so that the second projected wall 36d2 does not overly interfere with the arm 63b. This facilitates accommodation of the arm 63b. Thus, the arm 63b can be readily accommodated in the accommodation pit 36a.

The projecting height of the first projected wall 36d1 is greater than the thickness of the arm 63b. The distal portion of the first projected wall 36d1 is narrowed toward its tip. The opening at the upper end of the accommodation pit 36a is relatively large. Such a structure functions as a guide of the accommodation pit 36a.

To function as the guide, the accommodation pit 36a does not have to satisfy all of the conditions described above, which are the projecting height of the first projected wall 36d1 being greater than the thickness of the arm 63b, the distal portion of the first projected wall 36d1 being narrowed toward its tip, and the opening at the upper end of the accommodation pit 36a being relatively large. The accommodation pit 36a can function as the guide by satisfying one or more of these conditions. The guide may be omitted.

As shown in FIG. 8, when the arm 63b is accommodated in the accommodation pit 36a, the first projected wall 36d1 and the second projected wall 36d2 are sandwiched by the bifurcated portion of the arm 63b. The first projected wall 36d1 and the second projected wall 36d2 extend from the peripheral wall 36b toward the branching portion 63e of the arm 63b.

When the arms 63b are accommodated in the corresponding accommodation pits 36a of the housing 36, linear movement of the stopper plate 63 is permitted in the width direction DX and restricted in the front-rear direction DY. More specifically, the arm 63b contacts the peripheral wall 36b of the accommodation pit 36a, and the bifurcated portion of the arm 63b contacts the first projected wall 36d1 and the second projected wall 36d2. This restricts movement of the arm 63b in the front-rear direction DY.

When a rotating force is applied to the stopper plate 63, the force is received by the first projected wall 36d1 and the second projected wall 36d2 in addition to the peripheral wall 36b in the accommodation pit 36a. In this manner, the force applied by the arm 63b is distributed to different parts of the accommodation pit 36a. This improves the durability of the accommodation pit 36a and the arm 63b.

The branching portion 63e is provided in only one of the arms 63b but may be provided in both of the arms 63b. In the same manner, the projected wall 36d is provided in only one of the accommodation pits 36a of the housing 36 but may be provided in both of the accommodation pits 36a.

The projected wall 36d may be omitted from the accommodation pit 36a of the housing 36. In the same manner, the branching portion 63e may be omitted from the arm 63b of the stopper plate 63.

External Gear 62

As shown in FIGS. 3 and 4, the external gear 62 includes a disc-shaped main body 62a, the center of which is the rotation axis Ax3, and a flange 62b, located at the lower side of the main body 62a in the up-down direction DZ. The flange 62b has a larger outer diameter than the main body 62a. External teeth 62c are formed on the outer circumference of the main body 62a. The external teeth 62c project from the main body 62a in the radial direction with respect to the rotation axis Ax3 and are arranged at substantially equal intervals in the circumferential direction with respect to the rotation axis Ax3. An insertion hole 62d extends through the central portion of the main body 62a along the rotation axis Ax3.

Figure 9:
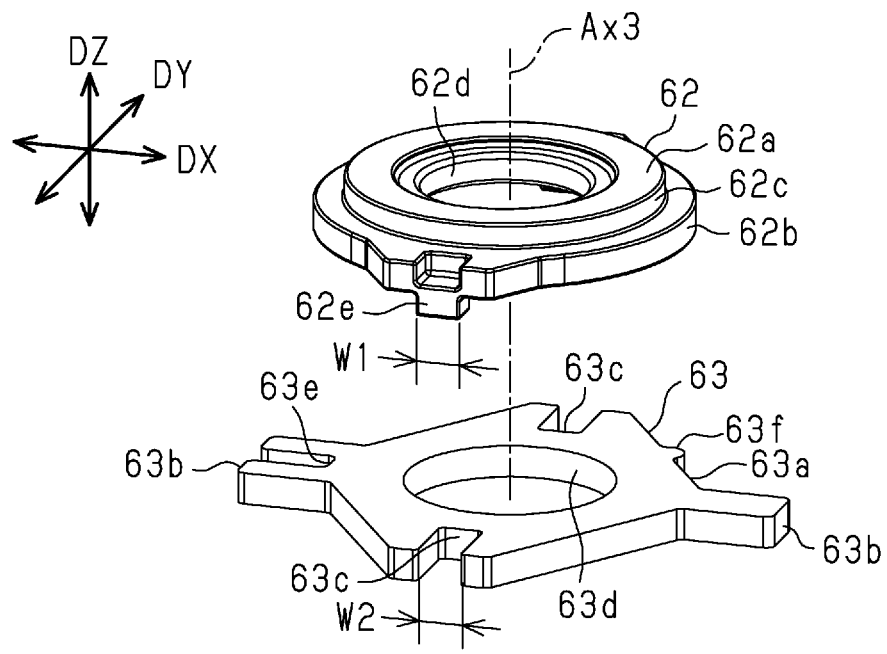
FIG. 9 is a perspective view of the stopper plate and a second gear.
Figure 13:
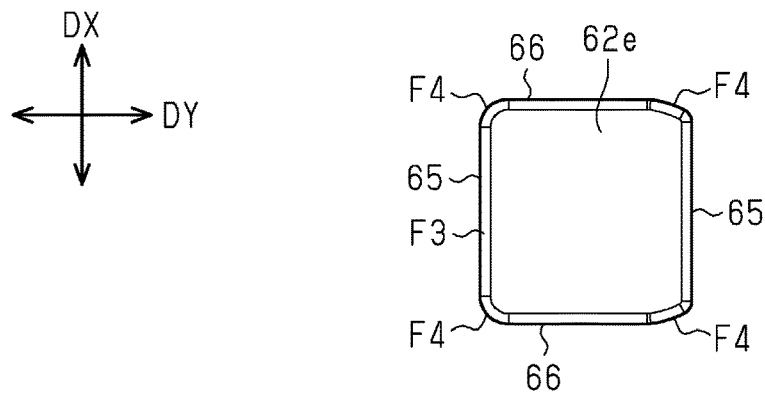
FIG. 13 is a plan view of an engagement claw.
Figure 14:
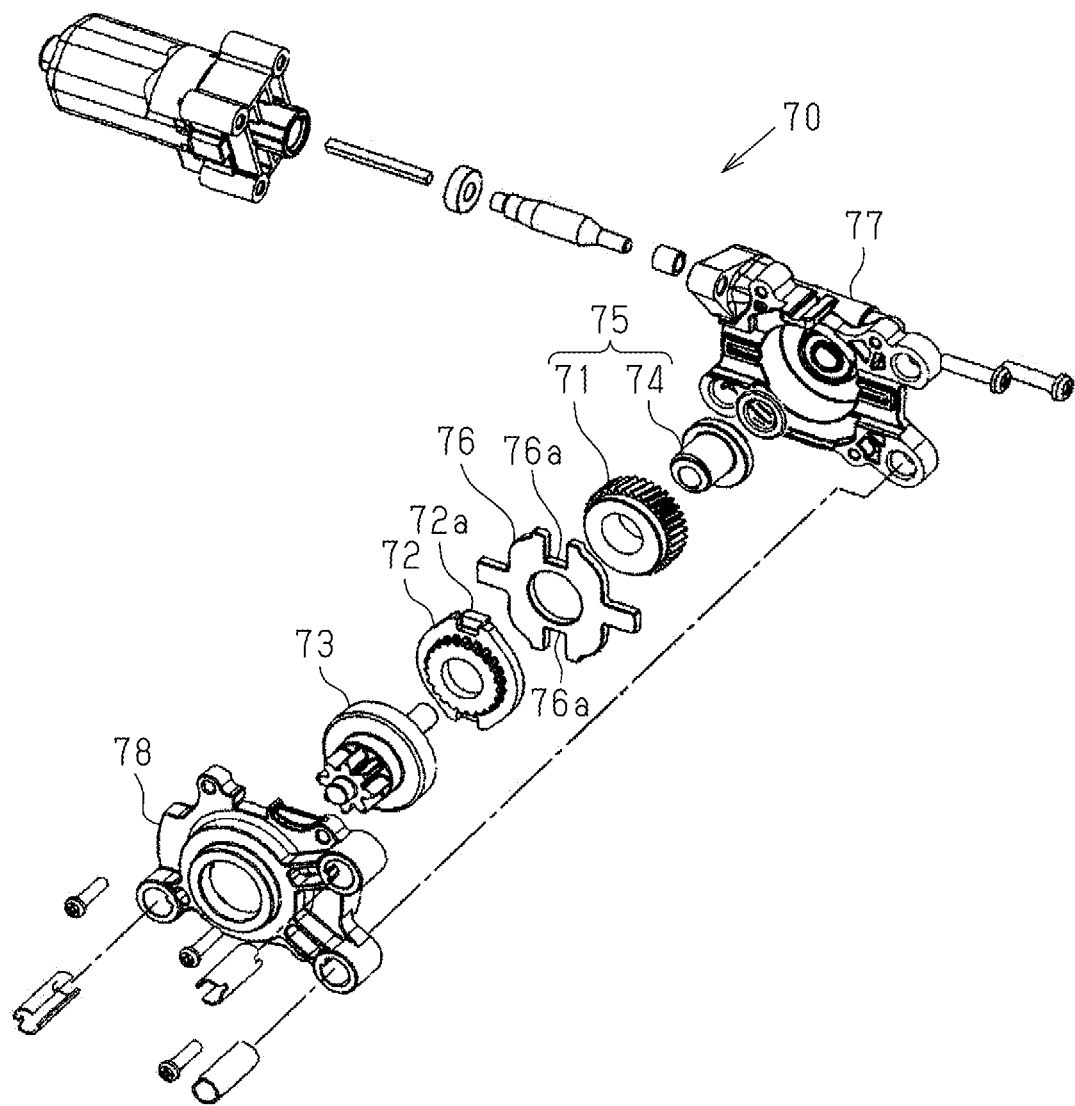
FIG. 14 is an exploded perspective view of a prior art gear device.

As shown in FIGS. 9 and 13, two engagement claws 62e project downward in the up-down direction DZ from the flange 62b of the external gear 62 at opposite sides of the rotation axis Ax3. The width W1 of each engagement claw 62e in the width direction DX is slightly less than the width W2 of each recess 63c of the stopper plate 63 in the same direction.

Figure 10:
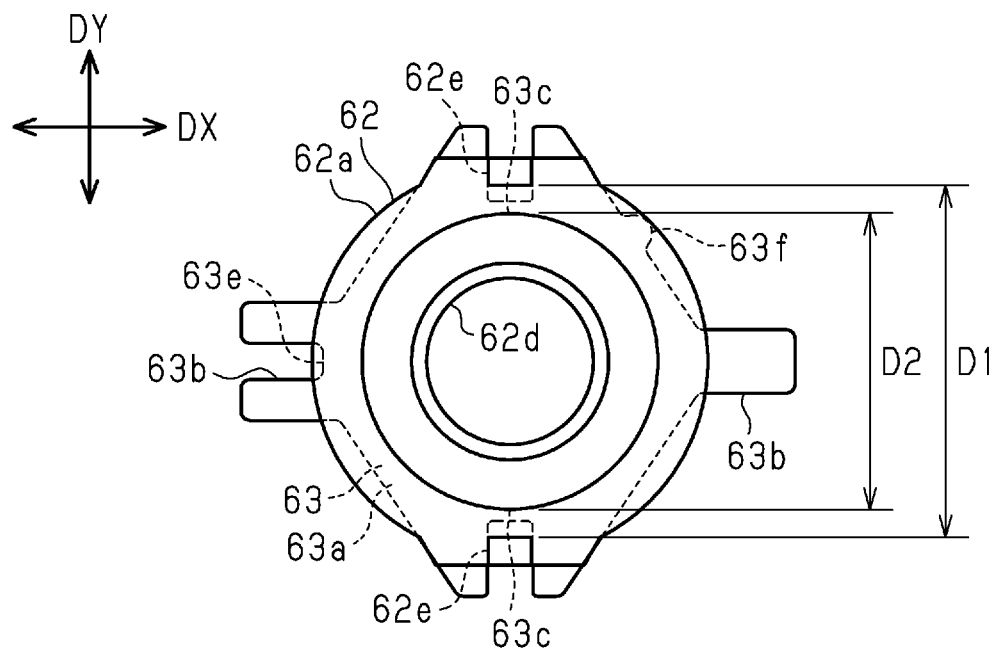
FIG. 10 is a plan view of the stopper plate and the second gear.
Figure 12:
FIG. 12 is a side view of the second gear.

As shown in FIGS. 10 and 12, the distance D1 between the engagement claws 62e is greater than the distance D2 between the distal ends of the recesses 63c in the stopper plate 63.

The external gear 62 is set on the stopper plate 63, and the engagement claws 62e of the external gear 62 are received in the recesses 63c of the stopper plate 63. As a result, the external gear 62 becomes linearly movable relative to the stopper plate 63 in the front-rear direction DY over a distance corresponding to the difference between the distances D1 and D2. Further, liner movement of the external gear 62 relative to the stopper plate 63 is restricted in the width direction DX.

Figure 11:
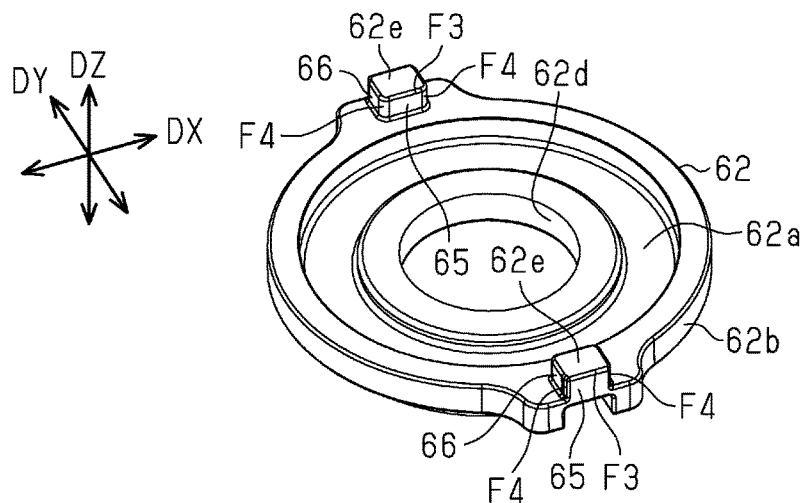
FIG. 11 is a perspective view showing a rear side of the second gear.

FIG. 11 shows the external gear 62 with its lower surface facing the upper side. That is, FIG. 11 shows the external gear 62 reversed upside down.

As shown in FIGS. 11 and 13, the engagement claws 62e are posts having a rectangular cross section and projecting in a thickness direction of the external gear 62. Each engagement claw 62e includes two opposing first side walls 65 and two opposing second side walls 66. The opposing direction of the first side walls 65 corresponds to the front-rear direction DY, which is the linear movement direction of the external gear 62.

As shown in FIGS. 11 and 13, each engagement claw 62e includes a distal end. A beveled surface F3 extends along the periphery of the distal end. More specifically, the four edges at the distal end of the engagement claw 62e include beveled surfaces F3. Further, the four sides of the engagement claw 62e extending from the basal end to the four edges of the distal end also include beveled surfaces F4. In this manner, each engagement claw 62e includes the beveled surfaces F3 and F4. Thus, when grease is applied between the engagement claws 62e of the external gear 62 and the recesses 63c of the stopper plate 63, the grease is held on the beveled surfaces F3 and F4. Since grease is held on the beveled surfaces F3 and F4, the grease will not escape from between the engagement claws 62e and the recesses 63c when the external gear 62 moves linearly. Thus, the beveled surfaces F3 and F4 of the engagement claws 62e function as grease sumps. All of the edges and sides of the engagement claws 62e do not have to include the beveled surfaces F3 and F4 as described above, and only some of these portions may include the beveled surfaces F3 and F4.

Among the four edges of the distal end of each engagement claw 62e, it is preferred that the beveled surfaces F3 and F4 be included in the edge continuous with the first side wall 65 located at the radially outward side of the external gear 62 and the sides continuous with the second side walls 66 in the first side wall 65 that is located at the radially outward side of the external gear 62. This allows grease sumps to be formed in the portions of the engagement claws 62e facing the movement direction of the external gear 62 when the external gear 62 moves linearly in the radial direction. This limits the grease that escapes outward in the radial direction. The beveled surfaces F4 provided at the locations described above form grease sumps over a relatively large range on each engagement claw 62e.

The grease sumps do not have be shaped as the beveled surfaces F3 and F4. Depressions may be formed in the first side walls 65 and the second side walls 66 of the engagement claws 62e to hold grease. The edges of the recesses 63c in the stopper plate 63 may include beveled surfaces to form gaps extending to the corresponding engagement claws 62e so that the gaps function as grease sumps.

The engagement claws 62e of the external gear 62 do not have to be accommodated in the recesses 63c of the stopper plate 63 like in the present embodiment. The external gear 62 may include recesses, and the stopper plate 63 may include engagement claws. In this case, the engagement claws of the stopper plate 63 are accommodated in the recesses of the external gear 62. In this manner, the structures fitted together to engage the external gear 62 and the stopper plate 63 may be reversed.

Internal Gear 64

As shown in FIGS. 3 and 4, the internal gear 64 includes a disc-shaped main body 64a and a flange 64b located at the lower side of the main body 64a in the up-down direction DZ. The flange 64b has a larger diameter than the main body 64a. The inner circumference of the flange 64b includes inner teeth 64c.

The inner teeth 64c project from the flange 64b inward in the radial direction with respect to the rotation axis Ax2 and are arranged at substantially equal intervals in the circumferential direction with respect to the rotation axis Ax2. There are more inner teeth 64c than the external teeth 62c. For example, the number of the inner teeth 64c is greater by one or two than the number of the external teeth 62c.

An insertion hole 64d extends through a central portion of the main body 64a of the internal gear 64. The center of the insertion hole 64d coincides with the rotation axis Ax2. The output shaft 43 is inserted through the insertion hole 64d. The internal gear 64 is rotated integrally with the output shaft 43.

The stopper plate 63, the external gear 62, the internal gear 64, the output shaft 43, the eccentric shaft 61, and the worm wheel 52 are not particularly limited in material although it is preferably that the material be metal to obtain superior mechanical strength and heat resistance.

Assembled Mechanism of Second Reduction Unit 42

As shown in FIG. 3, the urging member 39 is arranged in the housing 36. Further, the first gear 69, which includes the eccentric shaft 61 and the worm wheel 52, are accommodated in the housing 36. Then, the stopper plate 63, which serves as a restriction member, is arranged on the first gear 69. The arms 63b of the stopper plate 63 are arranged in the corresponding accommodation pits 36a of the housing 36, and the eccentric shaft 61 is inserted through the through hole 63d of the stopper plate 63. The external gear 62, which serves as a second gear, is arranged on the stopper plate 63. The engagement claws 62e of the external gear 62 are arranged in the recesses 63c of the stopper plate 63. The output shaft 43 is inserted through the insertion hole 62d of the external gear 62 and the insertion hole 61c of the eccentric shaft 61 to couple the internal gear 64. At least one of the inner teeth 64c of the internal gear 64 is meshed with at least one of the external teeth 62c of the external gear 62. Then, screws 38 are used to attach the cover 37 to the housing 36. The cover 37 includes an insertion hole 37a. The pinion 29a of the output shaft 43 extends through the insertion hole 37a and out of the housing 36.

The urging member 39 may be omitted. Thus, the second reduction unit 42 may be assembled without the urging member 39. The urging member 39 does not have to be a Belleville spring and may be a rubber member or a spring.

As shown in FIGS. 3 and 4, the cover 37 includes a curved groove 37b projecting downward in the up-down direction DZ around the insertion hole 37a. The groove 37b is annular and formed around the insertion hole 37a through a beading process.

As shown in FIG. 4, in a view taken in the front-rear direction DY, the groove 37b is located between the central portion and outer circumferential portion of the internal gear 64, closer to the outer circumferential portion, in the width direction DX. In the same manner, in a view taken in the width direction DX, the groove 37b is located between the central portion and outer circumferential portion of the internal gear 64, closer to the outer circumferential portion, in the front-rear direction DY. The groove 37b includes a bottom point P that is in contact with the internal gear 64.

The groove 37b of the cover 37 increases the strength of the cover 37 in the thickness direction. This limits deformation of the cover 37 in the thickness direction. The groove 37b functions as a deformation resistance portion.

The groove 37b is formed through a beading process. Thus, the deformation resistance portion can be formed through a simple process.

As shown in FIG. 4, the urging member 39, the eccentric shaft 61, the worm wheel 52, the stopper plate 63, the external gear 62, the internal gear 64, and the like are arranged in the housing 36. As described above, rotation of the worm wheel 52 eccentrically offsets the external gear 62 and reduces the speed of the rotation of the internal gear 64. The repulsion force of the urging member 39 in the housing 36 produces an urging force directed upward with respect to the up-down direction DZ. Multiple components are moved in cooperation in the housing 36. This increases stress that acts in the upward direction. The urging force and stress results in a tendency to upwardly move the outer circumferential portion of the internal gear 64 and thereby deform the cover 37. In the present embodiment, the groove 37b is located between the central portion and outer circumferential portion of the internal gear 64, closer to the outer circumferential portion, in the width direction DX. This limits deformation in the thickness direction of the cover 37. Further, the bottom point P of the groove 37b contacts the internal gear 64. This limits deformation in the thickness direction of the cover 37.

The deformation resistance portion does not have to be shaped like the groove 37b. For example, the thickness of the cover 37 may be locally increased to resist deformation. Alternatively, reinforcements may be locally attached to the cover 37 in order to resist deformation.

Further, the groove 37b does not have to be located between the central portion and outer circumferential portion of the internal gear 64, closer to the outer circumferential portion, in the width direction DX. The groove 37b may be located at a middle point between the central portion and outer circumferential portion of the internal gear 64 in the width direction DX. Alternatively, the groove 37b may be located closer to the central portion. The bottom point P of the groove 37b in the cover 37 may be located proximate to the internal gear 64 instead of contacting it.

The deformation resistance portion may be omitted from the cover 37.

Moving Mechanism of Second Reduction Unit 42

When the worm wheel 52 of the first gear 69 is rotated about the rotation axis Ax2, the eccentric shaft 61 revolves about the rotation axis Ax2. The stopper plate 63 does not allow the external gear 62 to rotate together with the eccentric shaft 61. The external gear 62 is moved in the circumferential direction with respect to the rotation axis Ax2 along a circular path, the radius of which is the distance between the rotation axis Ax2 and the rotation axis Ax3. Thus, the external gear 62 revolves about the rotation axis Ax2.

When the external gear 62 revolves, the external teeth 62c of the external gear 62 moves in the circumferential direction with respect to the rotation axis Ax2. The number of the inner teeth 64c of the internal gear 64 is greater than the number of the external teeth 62c. Thus, as the external gear 62 revolves, the portion where the inner teeth 64c is meshed with the external teeth 62c moves about the rotation axis Ax2. Movement of the portion where the inner teeth 64c is meshed with the external teeth 62c about the rotation axis Ax2 revolves the internal gear 64 about the rotation axis Ax2. When the external gear 62 completes a single revolution, the internal gear 64 is rotated by an amount corresponding to the movement of the portion where the inner teeth 64c is meshed with the external teeth 62c. This reduces the rotation speed of the internal gear 64 from the rotation speed of the worm wheel 52. Thus, the internal gear 64 is rotated at a lower speed than the first gear 69. In this manner, the second reduction unit 42 reduces speed through a taumel mechanism.

Operation and Advantages of Present Embodiment (1) One of the external gear 62 and the stopper plate 63 includes the engagement claws 62e, and the other one of the external gear 62 and the stopper plate 63 includes the recesses 63c, which are engaged with the engagement claws 62e. The engagement claws 62e includes grease sumps that hold the grease applied between the engagement claws 62e and the recesses 63c. In this manner, grease is held in the grease sumps of the engagement claws 62e. This allows the grease to remain between the engagement claws 62e and the recesses 63c over a relatively long period of time.

(2) The grease sumps extend along the periphery of the distal end of each engagement claw 62e. Thus, grease is held by the periphery of the distal end of the engagement claws 62e. This allows the grease to remain between the engagement claws 62e and the recesses 63c over a relatively long period of time.

(3) The external gear 62 includes the engagement claws 62e, and the stopper plate 63 includes the recesses 63c. Each engagement claw 62e is a post having a rectangular cross section and projecting in the thickness direction of the external gear 62. The engagement claw 62e includes the two opposing first side walls 65 and the two opposing second side walls 66. The opposing direction of the first side walls 65 corresponds to the linear movement direction of the external gear 62. The distal end of the engagement claw 62e includes four edges, one of which forms a grease sump and is continuous with the one of the two first side walls 65 located at the radially outer side of the external gear 62. The grease sump is formed in the portion of the engagement claw 62e facing the movement direction of the external gear 62 when the external gear 62 moves linearly and outwardly in the radial direction of the external gear 62. Accordingly, the grease will remain between the engagement claw 62e and the recess 63c when the external gear 62 moves linearly and outwardly in the radial direction of the external gear 62.

(4) The external gear 62 includes the engagement claws 62e, and the stopper plate 63 includes the recesses 63c. Each engagement claw 62e is a post having a rectangular cross section and projecting in the thickness direction of the external gear 62. The engagement claw 62e includes the two opposing first side walls 65 and the two opposing second side walls 66. The opposing direction of the first side walls 65 corresponds to the linear movement direction of the external gear 62. The one of the two first side walls 65 located at the radially outward side of the external gear 62 includes sides that are continuous with the second side walls 66 and form grease sumps. Thus, grease sumps are formed over a relatively large area in the portion of the engagement claw 62e facing the movement direction of the external gear 62 when the external gear 62 moves linearly and outwardly in the radial direction of the external gear 62. Accordingly, the grease will remain between the engagement claw 62e and the recess 63c when the external gear 62 moves linearly and outwardly in the radial direction of the external gear 62.

Other Embodiments

The above embodiment may be modified as described below. The above embodiment and the following modifications can be combined as long as there is no technical contradiction.

The second gear does not have to be the external gear 62, and the third gear does not have to be the internal gear 64. The second gear may be an inner gear, and the third gear may be an external gear.

In the above embodiment, the gear device 32 includes the rotation transmission mechanism 35, the housing 36, and the cover 37. Further, the rotation transmission mechanism 35 includes the first reduction unit 41, the second reduction unit 42, and the output shaft 43. However, there is no limitation to such structures. The first reduction unit 41 may be omitted from the rotation transmission mechanism 35. In this case, the second reduction unit 42 of the rotation transmission mechanism 35 may directly reduce the speed of the rotation produced by the motor 31. Further, a typical external gear may be used instead of the worm wheel 52 as a gear portion.

The gear device 32 does not have to be used in a seat lifter that raises and lowers the seat 11 of a vehicle. The gear device 32 may be any gear device that includes a taumel mechanism. A gear device including a taumel mechanism is, for example, a gear device that slides a seat in front and rear directions or a gear device that reclines a seat.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A gear device, comprising:

a first gear;

a second gear offset eccentrically when the first gear is rotated;

a third gear rotated at a speed slower than a rotation speed of the first gear when the second gear is offset eccentrically; and a stopper plate engaged with the second gear through a fitting structure thereby restricting rotational movement of the second gear while permitting linear movement of the second gear, wherein:

one of the second gear and the stopper plate includes an engagement claw;

the other one of the second gear and the stopper plate includes a recess engaged with the engagement claw;

the engagement claw includes a grease sump that holds grease applied between the recess and the engagement claw;

the engagement claw is a post having a rectangular cross section and projecting in a thickness direction of one of the second gear and the stopper plate, the engagement claw including two opposing first side walls and two opposing second side walls;

the first side walls oppose each other in a direction corresponding to a linear movement direction of the second gear; and the engagement claw includes a distal end having four edges, one of which includes the grease sump and is continuous with one of the two first side walls that is located at a radially outward side of the second gear.

2. The gear device according to claim 1, wherein the grease sump extends along a periphery of a distal end of the engagement claw.

3. A gear device, comprising:

a first gear;

a second gear offset eccentrically when the first gear is rotated;

a third gear rotated at a speed slower than a rotation speed of the first gear when the second gear is offset eccentrically; and a stopper plate engaged with the second gear through a fitting structure thereby restricting rotational movement of the second gear while permitting linear movement of the second gear, wherein:

one of the second gear and the stopper plate includes an engagement claw;

the other one of the second gear and the stopper plate includes a recess engaged with the engagement claw;

the engagement claw includes a grease sump that holds grease applied between the recess and the engagement claw;

the engagement claw is a post having a rectangular cross section and projecting in a thickness direction of one of the second gear and the stopper plate, the engagement claw including two opposing first side walls and two opposing second side walls;

the first side walls oppose each other in a direction corresponding to a linear movement direction of the second gear; and one of the two first side walls located at a radially outward side of the second gear includes sides that are continuous with the second side walls, the sides including the grease sump.

4. The gear device according to claim 1, wherein the one of the two first side walls located at the radially outward side of the second gear includes sides that are continuous with the second side walls, the sides including the grease sump.

5. The gear device according to claim 2, wherein the one of the two first side walls located at the radially outward side of the second gear includes sides that are continuous with the second side walls, the sides including the grease sump.

6. The gear device according to claim 3, wherein the grease sump extends along a periphery of a distal end of the engagement claw.

7. The gear device according to claim 1, wherein:
the second gear includes the engagement claw;
the stopper plate includes the recess; and
the engagement claw is the post having the rectangular cross section and projecting in the thickness direction of the second gear.

8. The gear device according to claim 2, wherein:
the second gear includes the engagement claw;
the stopper plate includes the recess; and
the engagement claw is the post having the rectangular cross section and projecting in the thickness direction of the second gear.

9. The gear device according to claim 3, wherein:
the second gear includes the engagement claw;
the stopper plate includes the recess; and
the engagement claw is the post having the rectangular cross section and projecting in the thickness direction of the second gear.

10. The gear device according to claim 6, wherein:
the second gear includes the engagement claw;
the stopper plate includes the recess; and
the engagement claw is the post having the rectangular cross section and projecting in the thickness direction of the second gear.

* * * * *